United States Patent [19]

Kobayashi

[11] Patent Number: 5,041,068

[45] Date of Patent: Aug. 20, 1991

[54] DIFFERENTIAL DEVICE FOR A FOUR-WHEEL DRIVE MOTOR VEHICLE

[75] Inventor: Toshio Kobayashi, Tokyo, Japan

[73] Assignee: Fuji Jukogyo Kabushiki Kaisha, Tokyo, Japan

[21] Appl. No.: 488,355

[22] Filed: Mar. 2, 1990

[30] Foreign Application Priority Data

Mar. 10, 1989 [JP] Japan .................. 1-059195

[51] Int. Cl.$^5$ .................. B60K 17/16; F16H 1/40
[52] U.S. Cl. .................. 475/221; 475/200; 475/206; 475/225; 180/248
[58] Field of Search ........... 475/221, 200, 206, 219, 475/225; 180/248

[56] References Cited

U.S. PATENT DOCUMENTS

| | | | |
|---|---|---|---|
| 4,428,452 | 1/1984 | Muraoka | 475/206 |
| 4,431,079 | 2/1984 | Suzuki | 475/221 |
| 4,582,160 | 4/1986 | Weismann et al. | 475/206 |
| 4,589,304 | 5/1986 | Ashikawa et al. | 475/225 |
| 4,601,359 | 7/1986 | Weismann et al. | 180/248 |
| 4,643,045 | 2/1987 | Katayama | 475/198 |
| 4,671,135 | 6/1987 | Dangel | 180/248 |
| 4,693,334 | 9/1987 | Hiraiwa | 180/249 |
| 4,697,470 | 10/1987 | Sasaki et al. | 475/206 |
| 4,779,699 | 10/1988 | Hatano | 475/206 |
| 4,788,886 | 12/1988 | Nussbaumer et al. | 475/225 |
| 4,805,713 | 2/1989 | Tsuneda | 475/206 |
| 4,817,753 | 4/1989 | Hiketa | 475/206 |

FOREIGN PATENT DOCUMENTS

| | | | |
|---|---|---|---|
| 0018656 | 1/1985 | Japan | 475/221 |
| 61-122033 | 6/1986 | Japan | . |
| 0232925 | 10/1986 | Japan | 180/248 |
| 0143726 | 6/1987 | Japan | 180/248 |
| 0097433 | 4/1988 | Japan | 180/248 |
| 0314626 | 12/1989 | Japan | 180/248 |
| 2021213 | 11/1979 | United Kingdom | 475/221 |

Primary Examiner—Allan D. Herrmann
Assistant Examiner—Daniel Wittels
Attorney, Agent, or Firm—Martin A. Farber

[57] ABSTRACT

A differential device having a central differential coaxially provided with an axle and a differential provided on the axle. The central differential has a differential case, a pair of pinion shafts, a pair of pinions rotatably mounted on the pinion shafts respectively, and first and second side gears engaged with the pinions. The pinion shafts are operatively connected to an output member of a transmission. The differential has a differential case operatively connected to the first side gear of the central differential, a pinion and a pair of side gears engaged with the pinion and secured to the axle, respectively. The second side gear of the central differential is operatively connected to the axle of the vehicle.

5 Claims, 3 Drawing Sheets

DIFFERENTIAL DEVICE FOR A FOUR-WHEEL DRIVE MOTOR VEHICLE

BACKGROUND OF THE INVENTION

The present invention relates to a differential device for a four-wheel drive motor vehicle, and more particularly to an arrangement and a structure of a differential device comprising a differential provided between axles and a central differential.

In a four-wheel drive motor vehicle having an engine with a transaxle laterally mounted therein, a central differential is disposed in a transmission case and a differential for one of front and rear wheel drive systems is disposed adjacent the central differential. The power transmission system becomes compact as the central differential is completely housed in a transmission case. However, the construction of the transaxle completely differs from that of a two-wheel drive vehicle. Consequently, the transaxle of the two-wheel drive vehicle can not be used for the four-wheel drive vehicle without greatly changing the structure near the final gear devices. To resolve the problem, there has been proposed a four-wheel drive power transmission system in which the central differential is disposed outside the transmission case of the two-wheel drive vehicle. Therefore, the transaxle of the two-wheel drive vehicle becomes compatible with the four-wheel drive vehicle, thereby enabling one to extensively use the same parts, resulting in a reduction of manufacturing cost.

U.S. Pat. No. 4,693,334 discloses a differential device for the four-wheel drive vehicle having an engine laterally mounted thereof. In the system, the central differential is provided in the transfer case and the front differential is disposed between a transmission case and the transfer case. However, the differential device has a problem as described hereinafter. In the differential device, as a lock-up clutch is disposed besides a ring gear of the central differential, lubricating oil must be the same as the clutch oil, so that separation of the oil is very difficult. Further, the ring gear becomes large because the pinion gears must be inside the ring gear. And the shafts of the pinions are supported by a carrier, so that each pinion is mounted in a hole formed in the differential case and supported in a form of a cantilever and large stress is concentrated in the carrier.

The central differential operates to transmit the output torque of the transmission to the side gears through the differential case, pinion shafts and the pinions. Accordingly, the torque acts to laterally push the pinion shafts, so that the shafts may deflect and sway in accordance with the variation of the torque dependent on the conditions of road surface and engine load. Consequently, the surfaces of the holes in the differential case and the pinion shaft are abraded by excessive surface pressure applied thereto. Particles of the material caused by the abrasion fly into the inner side of the pinions, causing the seizure the pinions to seize, and hence reducing durability and reliability of the system. Moreover, the holes in the differential case are enlarged so that the pinion shafts oscillate, which causes noise.

SUMMARY OF THE INVENTION

The object of the present invention is to provide a differential device for a four-wheel drive vehicle where the central differential is arranged so as to decrease the abrasion and vibration of the elements.

According to the present invention, there is provided a differential device for a four-wheel drive motor vehicle having an engine laterally mounted on the vehicle, a laterally mounted transmission for transmitting the power of the engine to first axles, a final gear operatively connected to an output shaft of the transmission, a central differential coaxially provided with the first axles, a differential provided between the axles, and a power transmitting system for transmitting the output of the central differential to second axles of the vehicle. The differential device has the central differential including a differential case, a pair of pinion shafts operatively connected to the final gear, a pair of pinions rotatably mounted on the pinion shafts respectively, and first and second side gears engaged with the pinions, the differential including a differential case operatively connected to the first side gear of the central differential, a pair of pinions and a pair of side gears engaged with the latter pinions and secured to the first axles, respectively, the second side gear of the central differential being operatively connected to the power transmitting system.

In an aspect of the invention, the pinion shafts are integral with a first drive shaft rotatably provided on one of the first axles and operatively connected to the final gear, the first side gear is connected to the differential case of the differential by a second drive shaft rotatably mounted on the same axle as the first drive shaft.

The other objects and features of this invention will become understood from the following description with reference to the accompanying drawings.

DETAILED DESCRIPTION OF THE PREFERRED EMBODIMENTS

Figure 1:
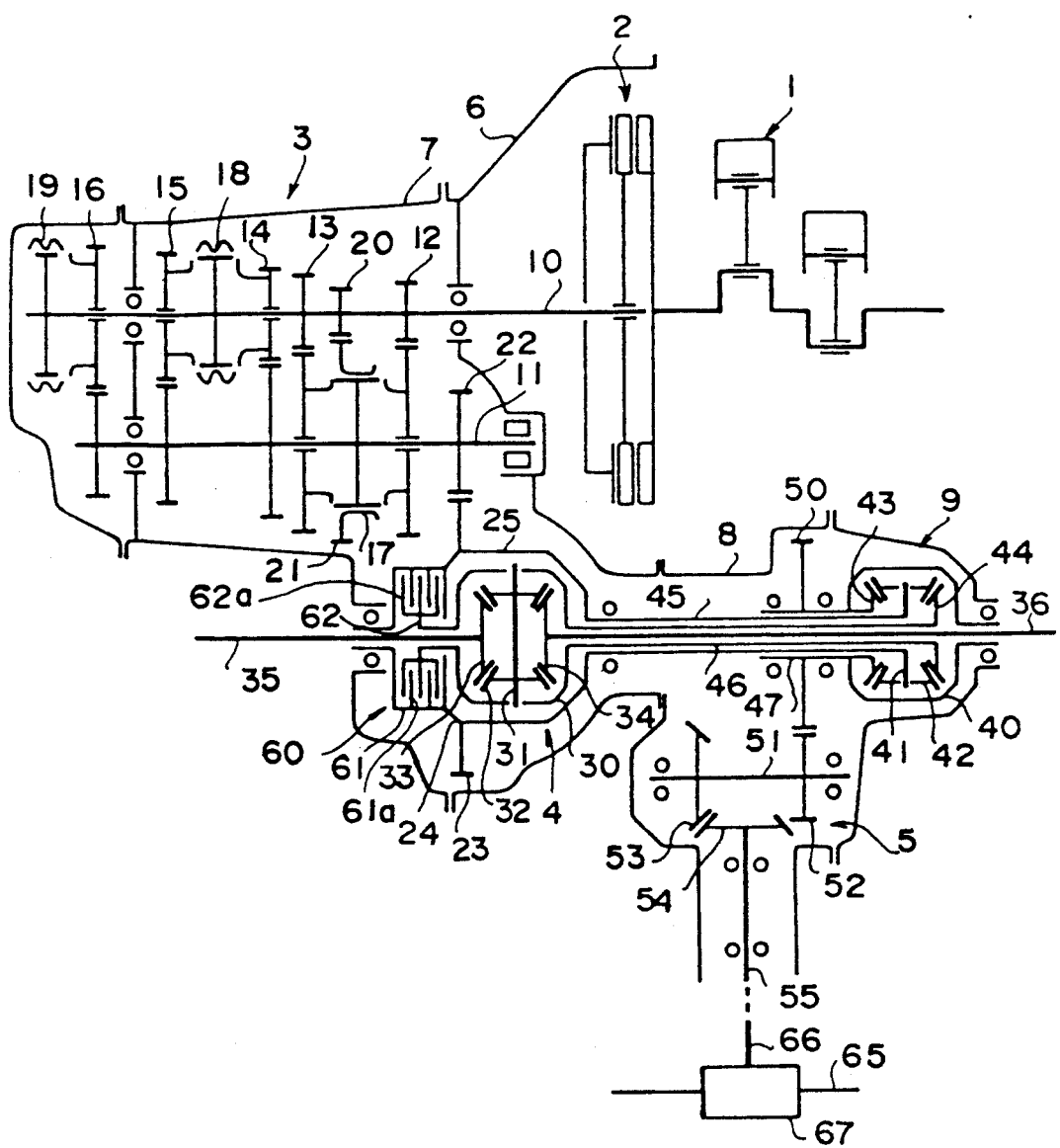
FIG. 1 schematic diagram of a four-wheel drive power transmission system of the present invention as a first embodiment.
Figure 2:
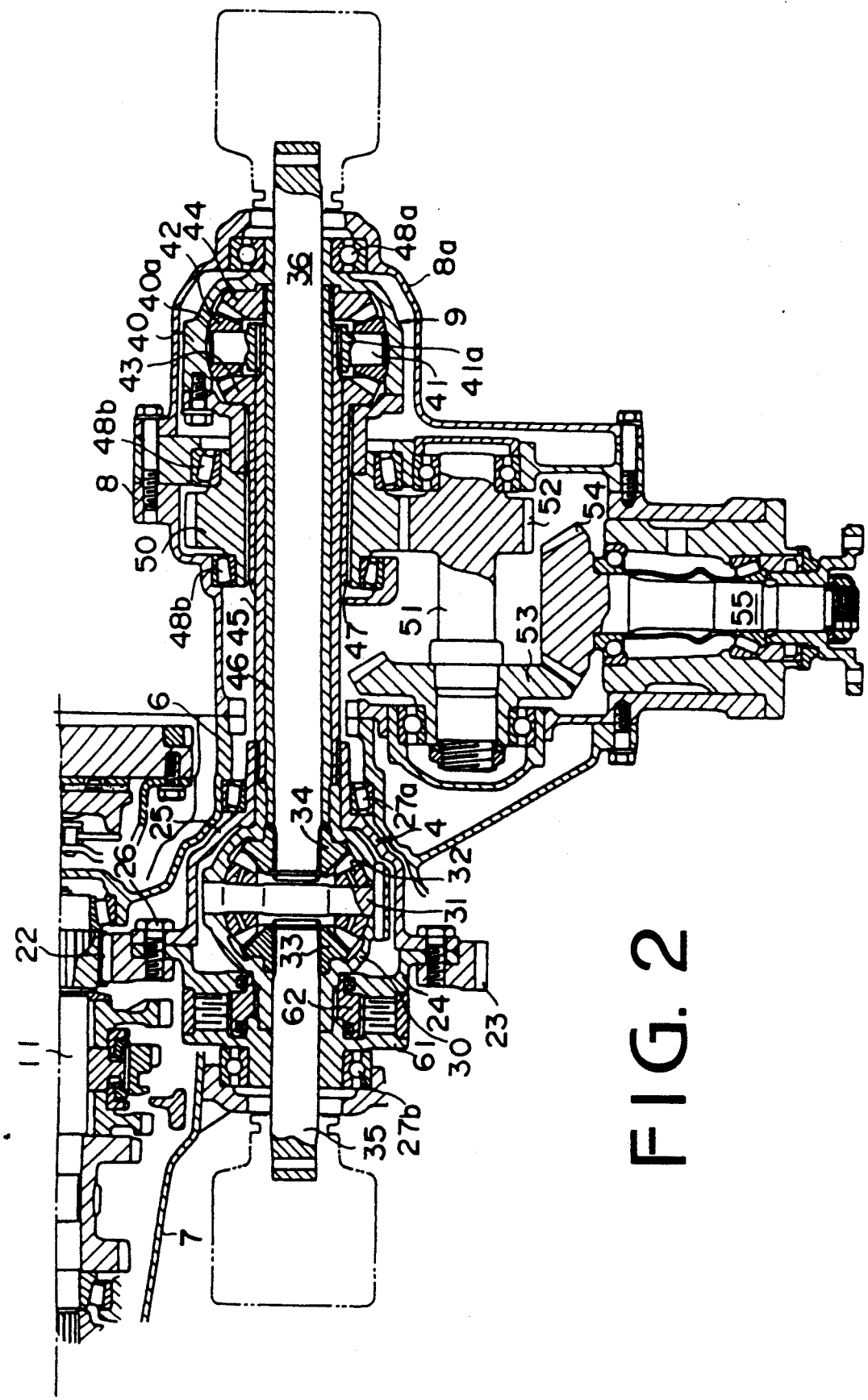
FIG. 2 is a sectional view of a main part of the power transmission system.

FIGS. 1 and 2 show a power transmission system for a four-wheel drive motor vehicle to which the present invention is applied. An engine 1 is laterally mounted on the motor vehicle at a front portion thereof. The power transmission system comprises a clutch 2 housed in a clutch housing 6, a transmission 3, a front differential 4, the latter two being housed in a transmission case 7 and a transfer device 5 housed in an extension case 8. The transmission 3 has an input shaft 10, an output shaft 11 parallel with the input shaft 10, five pairs of change-speed gears 12 to 16 corresponding to first to fifth (overdrive) speed gears, and synchronizers 17 to 19. The synchronizers 17 to 19 are disposed between the gears 12 and 13 and between 14 and 15 and adjacent the gears 16, respectively. A reverse drive gear 20 mounted on the input shaft 10 meshes with a gear 21 formed on one side of a sleeve of the synchronizer 17 through an idler gear (not shown) for reverse drive.

An output gear 22 fixedly mounted on the output shaft 11 meshes with a final gear 23 which is fixed to flanges of hub members 24 and 25 by bolts 26 (FIG. 2) at the inner periphery of the gear 23. The hub members 24 and 25 are rotatably supported in the clutch housing 6 and the transmission case 7 through bearings 27a and 27b. The front differential 4 is disposed inside the hub members 24 and 25.

The front differential 4 comprises a differential case 30 secured to the hub members 24 and 25, a pinion shaft 31 secured to the differential case 30, two differential pinions 32 rotatably mounted on the pinion shaft 31 and two bevel side gears 33, 34 meshed with the pinions 32. The side gears 33 and 34 are connected to left and right front axles 35 and 36 so as to respectively transmit the output power of the transmission to the left and right front wheels in the same manner as the two-wheel drive vehicle.

Figure 3:
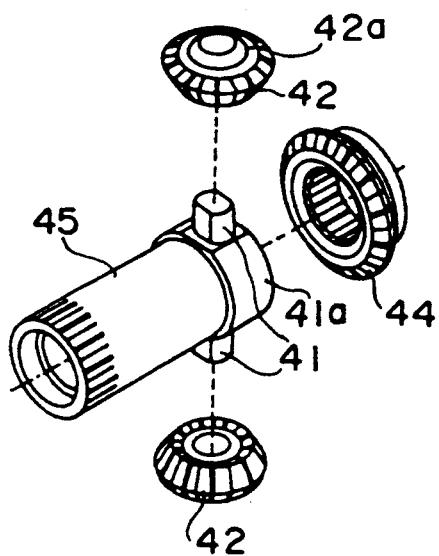
FIG. 3 is an exploded perspective view of a part of a central differential.

In the extension case 8, a central differential 9 is provided coaxially with the front differential 4 and the axle 36. The central differential comprises a differential case 40, a pair of pinions 42, a pair of pinion shafts 41 rotatably supporting the pinions 42, and a pair of side gears 43 and 44 meshed with both pinions 42. As shown in FIG. 3, the pinion shafts 41 are integrally formed on a ring 41a which is secured to a tubular first drive shaft 45. Namely the pinion shafts 41 are integral with the drive shaft 45. The first drive shaft 45 is rotatably mounted on a second drive shaft 46 and connected to the hub member 25. Each of the pinions 42 has a spherical end face 42a (FIG. 3) and slidably supported in an annular and spherical groove 40a formed on the inner wall of the differential case 40 so as to revolve in the groove 40a about the second drive shaft 46 with the rotation about the shafts 41.

The side gear 43 is integral with a side gear shaft 47 rotatably mounted on the first drive shaft 45 and connected to the differential case 40. The other side gear 44 is securely mounted on the second drive shaft 46 which is connected to the differential case 30 of the front differential 4. The differential case 40 is rotatably mounted in a transfer case 8a through a bearing 48a and connected to a transfer drive gear 50 which is securely mounted on the side gear shaft 47 and rotatably mounted in the extension case 8 through bearings 48b.

The transfer drive gear 50 engages with a driven gear 52 securely mounted on a transfer shaft 51 of the transfer device 5 which is disposed behind the axle 36 in parallel therewith. The transfer shaft 51 is connected to a rear drive shaft 55 perpendicular to the transfer shaft 51 through a pair of bevel gears 53, 54, thereby transmitting the power to rear axles 65 by way of a rear drive shaft 55, a propeller shaft 66 and a rear differential 67.

In order to restrict the differential operation of the central differential 9, the system of the present invention is further provided with a viscous coupling 60 in a space on the left side of the front differential 4. The viscous coupling 60 comprises a hollow hub 62 secured to the differential case 30 as one of the output members of the central differential 9 and a cylindrical housing 61 secured to the hub member 24 as an output member of the central differential and rotatably supported in the transmission case 7 through the bearing 27b. The hub 62 has a plurality of inner discs 62a and the housing 61 has a plurality of outer discs 61a which are alternately arranged in the axial direction of the viscous coupling 60. High viscous fluid is contained in the housing 61.

Describing the operation, the power of the engine 1 is transmitted to the transmission 3 through the clutch 2 and the input shaft 10. By operating the synchronizers 17, 18 and 19, the power of the engine is transmitted to the final gear 23 through the transmission 3. The transmitted power is further transmitted to the pinions 42 of the central differential 9 through the hub member 25, the first drive shaft 45 and the pinion shafts 41. When the pinions 42 revolve about the drive shaft 46, the side gears 43, 44 meshed with the pinions 42 are rotated at the torque distribution ratio of 50:50. The torque is transmitted from the side gear 44 to the differential case 30 of the front differential 4 through the second drive shaft 46. The torque is further transmitted to the left and right wheels through the pinion shaft 31, the pinions 32 and the side gears 33 and 34, and the left and right axles 35 and 36, respectively. At the same time, the torque is transmitted from the side gear 43 to the rear drive wheels through the side gear shaft 47, transfer drive gear 50, driven gear 52, transfer shaft 51, bevel gears 53, 54 and the rear drive shaft 55, thereby establishing a full time four-wheel drive.

When the vehicle turns around a corner, the difference between the speeds of the front and rear wheels is absorbed by the operation of the central differential 9. Thus the vehicle can smoothly turn the corner.

When one of the front and rear wheels slip and a large speed difference between the hub 62 and the housing 61 occurs, the viscous coupling 60 engages to restrict the differential operation of the central differential 9. Thus, the vehicle can easily get out a condition which it is stuck.

Figure 4:
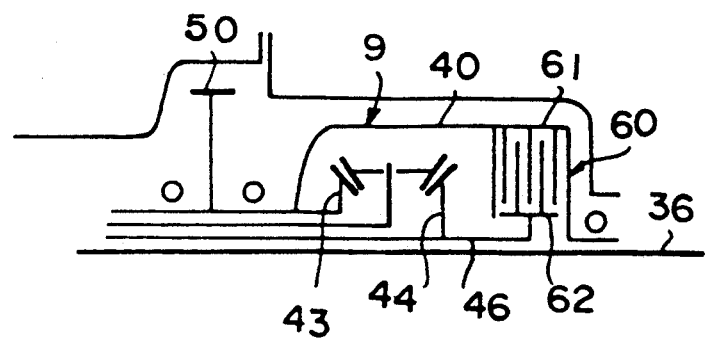
FIG. 4 is a schematic diagram showing a main part of a power transmission system of a second embodiment of the present invention.

FIG. 4 shows another embodiment of the present invention. In this embodiment, the viscous coupling 60 is provided adjacent the central differential 9. The second drive shaft 46 and the differential case 40 are extended and connected to the hub 62 and the housing 61 of the coupling 60. Thus, the differential operation of the central differential is restricted by the viscous coupling 60.

The present invention may be adapted to a rear drive vehicle with a rear engine and also to a vehicle provided with an automatic transmission or a continuously variable transmission.

From the foregoing, it will be understood that the present invention provides a central differential for a four-wheel drive vehicle where adhesion and vibration of pinions are prevented by the pinion shafts integral with the drive shaft, so that the durability and reliability of the differential are improved. Since the differential between the axles is disposed at the same position as the two-wheel drive vehicle, the four-wheel drive vehicle can be easily manufactured by using common parts of the two-wheel drive system.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A differential device for a four-wheel drive motor vehicle having an engine laterally mounted on said vehicle, and a transmission directly connected to said engine and being housed in a transmission case for operatively transmitting power of said engine to a wheel axle via an output gear, the differential device comprising a differential coaxially mounted on said wheel axle so as to differentiate speed between left and right wheels of the vehicle, a final gear integrally formed with a drive shaft of said differential and meshed with said output gear, and a central differential coaxially mounted on said wheel axle so as to differentiate speed between front and rear wheels of the vehicle, the improvement of the differential device which comprises:

a transfer case operatively connected to said transmission case for housing said central differential;

another axle coaxial to said wheel axle and connected to said first-mentioned differential, the axles each being operatively connected to one of said left and right wheels;

said central differential comprises:

a pair of pinion shafts radially outwardly extended from one end of said drive shaft;

a pair of pinions mounted on an outer end of said pinion shafts respectively;

a pair of side gears meshed with said pinions and connected so as to differentiate the speed between said front and rear wheels;

a central differential case formed about said drive shaft for housing said pinion shafts; and said pinion shafts are securely supported at an inside position on said drive shaft so as to directly transmit said power from said final gear to said side gears via said pinions without adhesion and vibration and to improve durability and reliability of said differential device.

2. The differential device according to claim 1, wherein the pinion shafts are integral with said drive shaft, the latter being rotatably provided on said wheel axle.

3. The differential device according to claim 2, further comprising:

another drive shaft rotatably provided on said wheel axle and connecting a first of said side gears with a differential case of the first-mentioned differential.

4. The differential device according to claim 3, further comprising:

a transfer drive gear rotatably and coaxially provided on said wheel axle and connected to a second of said side gears.

5. The differential device according to claim 2, further comprising:

an annular and spherical groove formed in the central differential case of the central differential for each of said pinions; and a wall of each groove formed in the central differential case slidably mounting the pinions respectively.

* * * * *